March 1, 1932.  W. J. ROY  1,847,901
CONNECTING LINK
Filed July 3, 1930
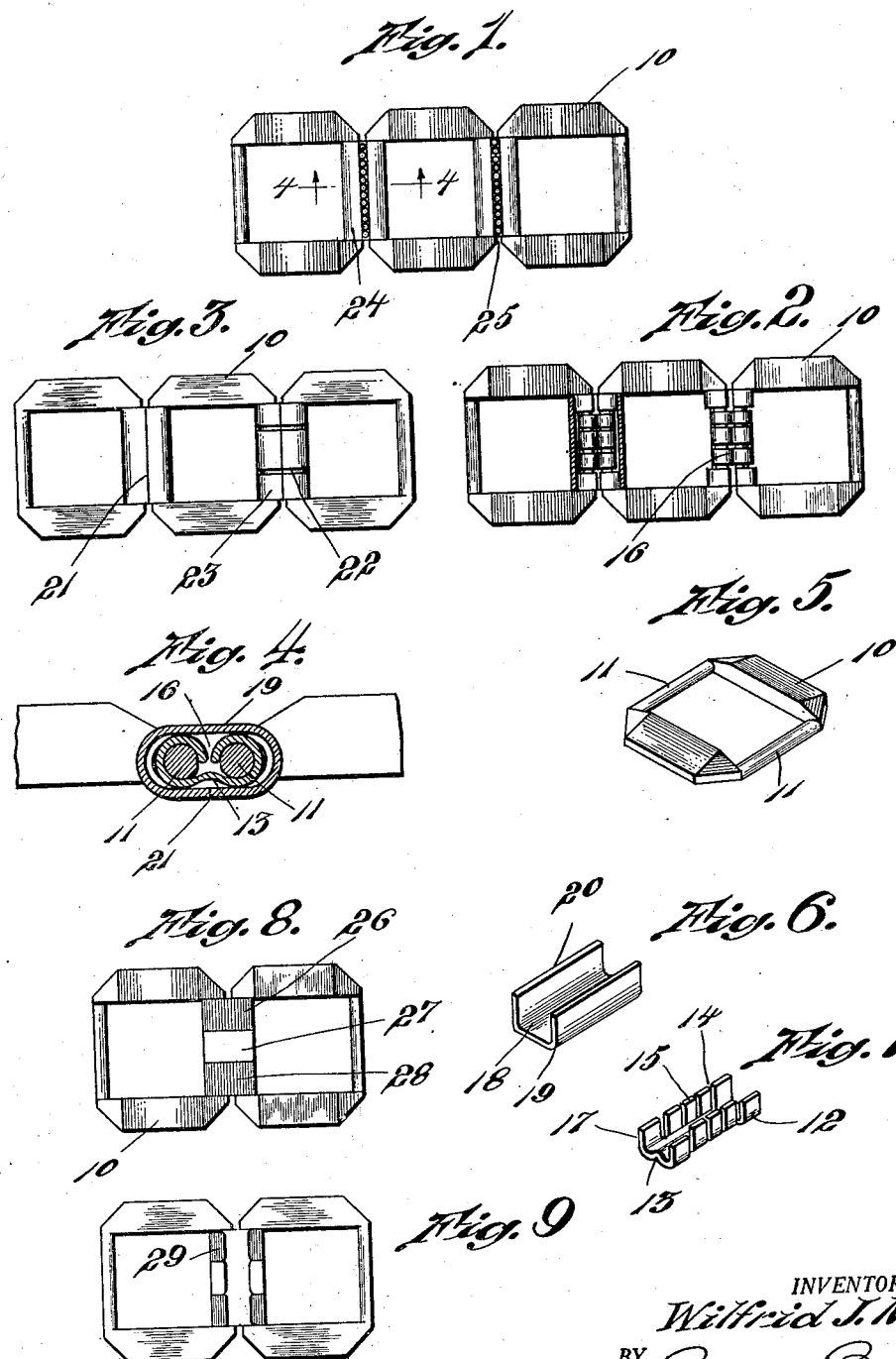
INVENTOR.
Wilfrid J. Roy
BY Barlow & Barlow
ATTORNEYS.

Patented Mar. 1, 1932

1,847,901

UNITED STATES PATENT OFFICE

WILFRID J. ROY, OF EAST ORANGE, NEW JERSEY, ASSIGNOR TO GEMEX COMPANY, A CORPORATION OF NEW JERSEY

CONNECTING LINK

Application filed July 3, 1930. Serial No. 465,614.

This invention relates to a connecting link for hingedly joining a series of adjacent body links; and has for its object to provide a construction which will be secure and durable and yet easily removed for shortening the chain by one or more links.

A further object of the invention is to provide a construction in which the body links of the chain may be provided with a certain finish and a contrasting appearance provided for the connecting links of the series.

A still further object of the invention is the provision of a construction in which the flexibility of the links will be smooth without binding of the parts.

With these and other objects and advantageous features in view, the invention consists of a novel arrangement of parts more fully disclosed in the detailed description following, in conjunction with the accompanying drawings, and more particularly set forth in the appended claims.

In the drawings:

Fig. 1 is a top plan view of a series of body links connected together by my connecting links;

Fig. 2 is a view similar to Figure 1 with the inner connecting link in position and the outer connecting link removed in one showing and connected in working position in another showing of the same;

Fig. 3 is a bottom view showing two different types of outer connecting links;

Fig. 4 is a section on line 4—4 of Figure 1;

Fig. 5 is a perspective view of one of the body links;

Fig. 6 is a perspective view of the outer connecting link;

Fig. 7 is a perspective view of the inner connecting link;

Fig. 8 is a top plan view of a modified form of outer connecting links, the same being formed in a plurality of parts;

Fig. 9 is a bottom view of the showing in Figure 8.

In an open work bracelet of the type having generally rectangular links with end bars connected together, it is desirable to vary the appearance of the same by the use of metals having different appearances such as differently colored metals or differently colored gold plates; and in order to provide a construction in which this may be accomplished in a practical manner, I have provided a connecting link for the body links made in a plurality of parts, the innermost one of which is hidden by the outermost, whereby a bracelet may be assembled with the inner connecting link joining the body links together, the same plated or finished as desired and the outer connecting links separately finished and then assembled with the chain to cover the inner links, and when desired present a different appearance, and in the provision of such construction many advantages follow, such as strength, ease of detachability and smooth working of the parts, etc.; and the following is a detailed description of the present embodiment of this invention illustrating the preferred means by which these advantageous results may be accomplished.

With reference to the drawings, the body links 10 are of generally rectangular shape having end bars 11 which are substantially circular in cross section. About these end bars the inner connecting link 12 is folded as illustrated at the right hand showing of the connection in Figure 2 with its edges upward.

The inner connecting link 12 is provided with a rib 13 to extend between and space the end bars 11 for smooth hinging action of the body links and is slotted along each of its edges, as at 14, to provide teeth or fingers 15 to be wrapped about the end bars 11 with their edges in close adjacency as at 16, in Figures 2 and 4.

The outer fingers or teeth 17 are spaced a greater distance apart than the intermediate teeth 15 to snugly fit the channel 18 of the outer connecting link 19 and prevent the outer link from binding the inner link. This outer connecting link 19 is oppositely disposed with reference to the inner link 12 so that its meeting edges 20 will be on the bottom of the bracelet, as shown at 21 in Figures 3 and 4.

The edges 20 of the outer connecting link may be slotted, as at 22, to provide fingers 23 similar to the fingers or teeth on the inner link. The fingers on these links have the advantage of permitting the links to be easily pried to open position by a tool for detaching one of the links to shorten the encircling size of the bracelet about the wrist, it being easier to lift one of the teeth at a time than the entire width of either the inner or outer connecting link.

The top surface 24 of the outer connecting link is ornamented as at 25 by beads or the like, or where desired the outer connecting link may be made in a plurality of parts 26, 27 and 28 folded about the inner link 12 with the edges 29 of these parts spaced a substantial distance, as shown in Figure 9.

By the construction here shown, the body links 10 may be joined together by the inner connecting links 12 and the series subjected to a plating operation or other finish, whereby all of the body links will be finished the same. The outer connecting link may be subjected to a different finishing operation, such as the provision of a gold plate where the body links are plated with chromium and a contrasting appearance is thus afforded when the outer connecting link is positioned.

Then again, where a greater variety of appearance is desired, the body links 10, as shown in Figure 8, may be finished in white gold and the connecting links 26 and 28 finished in red gold with an intermediate outer connecting link 27 finished in green gold, whereby a contrasting ornamental appearance for the bracelet is provided.

An advantage in the use of a plurality of parts for the connecting link is that the required strength of the connection is distributed between the plurality of parts forming the connection thereby making a more flexible and easier manipulating connecting link, that is, where a single connecting link is used, this single connecting link must itself be sufficiently strong so that it will resist to a predetermined extent detachment by unfolding. Where, however, a plurality of connecting links are used the required strength may be distributed between the two or more parts of the connection, so that each being of less holding strength will resist to a lesser degree the effort required for detachment, thus making it easier to pry off the connecting link of this construction to shorten the bracelet.

While I have described certain construction forms which embody the principles of my invention, it is obvious that other desired changes in arrangement may be made within the spirit and the scope of the invention as defined in the appended claims.

I claim:

1. In a bracelet, a series of body links having end bars, an inner connecting link embracing the end bars of the body links to hingedly connect them together, and a secondary connecting link consisting of a plurality of parts folded about the inner connecting link.

2. In a bracelet, a series of body links having end bars, an inner connecting link slit to form a plurality of teeth embracing the end bars of the body links to hingedly connect them together, and a secondary connecting link consisting of a plurality of parts folded about the inner connecting link.

3. In a bracelet, a series of body links having end bars, an inner connecting link slit to form a plurality of teeth embracing the end bars of the body links to hingedly connect them together, and a secondary connecting link slotted on its edges and folded about the inner connecting link.

4. In a bracelet, a series of body links having end bars, a sheet metal inner connecting link folded longitudinally with its abutting edges adjacent its center and embracing the end bars of the body links to hingedly connect them together, and a transversely extending rib formed by deflecting the stock of said connecting link to form a recess in one side and a projection on the other side to space the end bars of the body links.

5. In a bracelet, a series of body links having end bars, an inner connecting link embracing the end bars of the body links to hingedly connect them together, and a secondary connecting link folded about the inner connecting link, said connecting links being of substantially the same width, and also substantially the width of the end bars embraced.

6. In a bracelet, a series of body links having end bars, a plurality of connecting links overlying each other and folded about and embracing the end bars of adjacent body links to hingedly connect them together, the opposite edges of each of said connecting links lying in adjacency.

7. In a bracelet, a series of body links having end bars, a plurality of connecting links overlying each other and folded about and embracing the end bars of adjacent body links to hingedly connect them together, the opposite edges of each of said connecting links lying in adjacency, said connecting links being folded about said end bars alternately in opposite directions, whereby the meeting edges of each are oppositely arranged.

8. In a bracelet, a series of body links having end bars, a plurality of connecting links overlying each other and embracing the end bars of adjacent body links to hingedly connect them together, the inner one of said connecting links having a rib to space the end bars of the body links.

9. In a bracelet, a series of body links having end bars, a plurality of connecting links overlying each other and embracing the end bars of adjacent body links to hingedly connect them together, the inner one of said connecting links having a rib to space the end bars of the body links, the edges of the outer of said connecting links being spaced a substantial distance apart.

10. In a bracelet, a series of body links having end bars, a plurality of connecting links overlying each other and embracing the end bars of adjacent body links to hingedly connect them together, the inner one of said connecting links having a rib to space the end bars of the body links, the edges of the outer of said connecting links being in substantially contiguous relation.

In testimony whereof I affix my signature.

WILFRID J. ROY.